Figure 1:
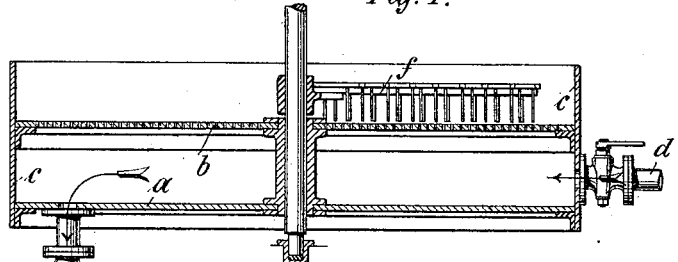

(No Model.)

J. FINKE.
PRESERVING CEREALS.

No. 348,320. Patented Aug. 31, 1886.

Witnesses:
W. W. Mortimer
H. H. Given

Inventor:
Joseph Finke,
by R. S. Dyrenforth,
his Attorney

UNITED STATES PATENT OFFICE.

JOSEPH FINKE, OF BERLIN, GERMANY.

PRESERVING CEREALS.

SPECIFICATION forming part of Letters Patent No. 348,320, dated August 31, 1886.

Application filed February 3, 1886. Serial No. 190,707. (No model.) Patented in England January 18, 1886, No. 786, and in Austria May 12, 1886.

*To all whom it may concern:*

Be it known that I, JOSEPH FINKE, a subject of the King of Prussia, residing at Berlin, Prussia, German Empire, have invented certain new and useful Improvements in Processes of Preserving Cereals, Mill-Ground Articles, &c., (upon which I have obtained British Patent No. 786 of 1886, and Austrian Patent, (number not issued as yet,) dated May 12, 1886;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the manufacture of a coherent mass from grain or the cereals, or from the outer portions thereof.

The object is to produce a firm and properly coherent cake, which shall keep well under various circumstances, which, even though chipped at the corners or edges, shall not readily fall to pieces, and which at the same time shall present the advantage of being small in volume, whereby it may conveniently be packed and readily transported.

Attempts have heretofore frequently been made to work the exterior portions, husks, shells, or cortex of grain and the cereals, especially bran, into a firm or solid mass by simple pressure; but these attempts have not been so far as known productive of good results. As a general thing, the cake which it was desired to make fell to pieces as soon as pressure was relieved, since the particles out of which it was desired to make the same, especially when these were bran, will not adhere or cohere of themselves. In order to get greater firmness of the cake it has been proposed to moisten the substance from which it is to be made, with water, which would put the glutinous matter into solution, and then to form the cake by pressing the mass in a hot press; but under this procedure only a coherent crust was formed upon the surface of the cake, so that upon any injury to this crust the cake fell apart. Furthermore, cakes of this kind retain so much water in their interior that decay readily sets in. By the present procedure all these defects are remedied.

The present invention consists in a mode of forming dry cake from the husks, shells, or cortex of the cereals, or from bruised or broken grain itself, especially though from bran, which consists in dissolving the glutinous substances contained in the material named, especially though the gum, only on the surface of the separate particles thereof, and this by means of hot steam, so that the body of the particles of the bran or other material shall remain dry, and then pressing the mass hot, whereby a coherent and dry cake will be formed.

It is obvious that this invention may be carried into effect in various ways, and that any suitable press will serve the purpose.

The salient feature of the invention resides in the presentation of the proper conditions to secure, by the use of steam at such high temperature, that without wetting their interiors, the agglutination of the particles of the mass may be secured to cause them to cohere into a firm and dry cake upon pressure, and so to make this portion of the case especially clear there is illustrated apparatus for producing this requisite condition of the particles of the material, as by due and proper steaming.

Figure 2:
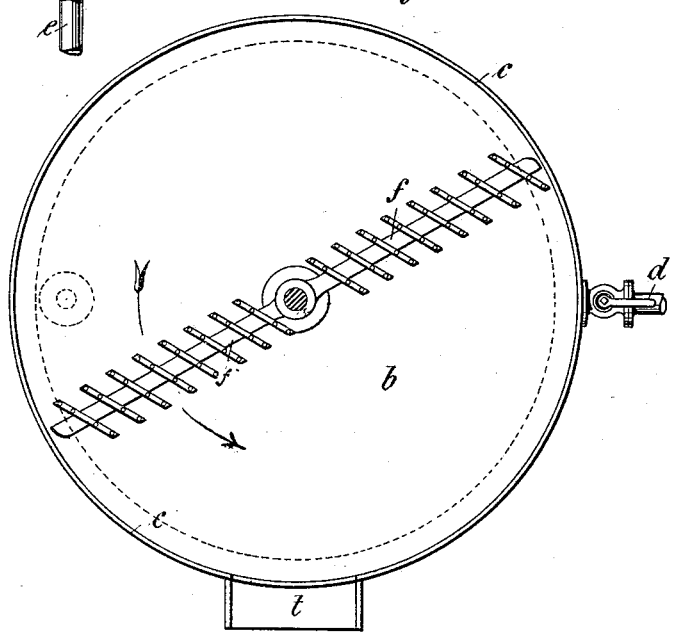

In the accompanying drawings, Figure 1 is a view in cross-section of a combined steaming and stirring apparatus. Fig. 2 is a plan view thereof.

The apparatus consists of a round flat vessel provided with a double bottom, *a b*. The upper bottom, *b*, is finely perforated, and the side wall, *c*, of the vessel extends a suitable distance above this upper bottom. The bran or other material to be treated is placed upon the perforated bottom *b*, and is thoroughly mixed by a mechanical stirrer, *f*. Into the space between the bottoms, and by means of a pipe, *d*, there is introduced steam, which forces itself through the perforations in the bottom *b* and among the bran constantly stirred, so that each particle thereof comes in contact with the steam. To carry off any water of condensation, as also to conduct away superfluous steam, the pipe *e* is provided. Above the bottom *b* the side wall, *c*, of the apparatus is broken away at a suitable point, and is there provided with a discharge-chute, t, so that the material which is driven outward by the operation of the stirrer f may pass to the press in a heated condition. It will be understood that any suitable press may be placed near the steaming apparatus.

The steam dissolves the glutinous matters on the surface of the separate particles at once and in sufficient quantity, so that upon the application of pressure a firm cohesion of all the parts is effected and the production of solid dry cake is achieved. The quantity of steam to be introduced into the apparatus is governed by the kind and quantity of material to be treated. As the bran passes to the press in a heated condition, the contained or inherent heat causes the cake to come from the press in an absolutely dry state, so that the same, even if stored in a place not perfectly dry, will not spoil.

There is no subsequent falling apart or crumbling of the cakes, since the material becomes unitary—in all parts a firmly-cohering mass; hence any breaking off or injury to the corners of a cake has no deleterious effect upon the holding together, firmness, or cohesion of the same. It is clear that to attain this result it is essential that the bran should be pressed while dry and hot, and that therefore the admission of steam must be so regulated that nothing like a pulpy mass will be formed. In such case upon pressing the crust which would be formed upon the surface of the cake would prevent a thorough drying, so that moisture would remain in the interior, which would be productive of speedy spoiling.

Although reference has been made chiefly to the pressing of bran into solid bodies, it will be apparent that by the same procedure coarse unbolted flour or meal or broken grain may likewise be converted into firm and solid cakes.

The invention may be clearly distinguished as follows: The formation of cakes by pressing bran is not new. This has even been done with a warming and steaming of the bran; but it is new in the procedure that directly before pressing the bran or the like is steamed, and to that point that the glutinous matter therein contained, especially the gum, is so far dissolved that the separate particles of the bran upon pressing into cake will firmly stick together without leaving the cake moist.

Having thus fully described my invention, what I claim as new, and desire to secure by Letters Patent, is—

1. The method of producing solid dry cake from the cortex or shells of the cereals, or from rough-ground, broken, or bruised grain, which consists in dissolving by hot steam the glutinous matters on the surface thereof without wetting the interiors of the particles, and then subjecting the mass to pressure while in a heated condition.

2. The method of producing solid dry cake from the cortex or shells of the cereals, or from rough-ground, broken, or bruised grain, which consists in dissolving the glutinous matters on the exterior of the particles of the material under treatment, as set forth, by the introduction of hot steam while the material is subjected to a stirring operation, and then immediately passing the mass to a press and subjecting it to pressure while in a heated condition, whereby a firm, dry, and preserved cake is formed, substantially as described.

In testimony whereof I affix my signature in presence of two witnesses.

JOSEPH FINKE.

Witnesses:
PAUL BOUR,
B. ROI.